(12) United States Patent
Zhang et al.

(10) Patent No.: US 9,071,863 B2
(45) Date of Patent: Jun. 30, 2015

(54) METHODS FOR INPUTTING SIGNALS INTO A SMART TV, A SMART TV, AND A SMART INTERACTION SYSTEM USING SUCH METHODS

(75) Inventors: Xiaoping Zhang, Beijing (CN); Zhepeng Wang, Beijing (CN)

(73) Assignees: LENOVO (BEIJING) LIMITED, Beijing (CN); BEIJING LENOVO SOFTWARE LTD., Beijing (CN)

( * ) Notice: Subject to any disclaimer, the term of this patent is extended or adjusted under 35 U.S.C. 154(b) by 0 days.

(21) Appl. No.: 14/233,443

(22) PCT Filed: Jun. 29, 2012

(86) PCT No.: PCT/CN2012/077910
§ 371 (c)(1),
(2), (4) Date: Jan. 17, 2014

(87) PCT Pub. No.: WO2013/013558
PCT Pub. Date: Jan. 31, 2013

(65) Prior Publication Data
US 2014/0165099 A1    Jun. 12, 2014

(30) Foreign Application Priority Data
Jul. 26, 2011 (CN) .......................... 2011 1 0210832

(51) Int. Cl.
| | |
|---|---|
| *G06F 3/048* | (2013.01) |
| *G06F 3/00* | (2006.01) |
| *H04N 21/422* | (2011.01) |
| *G06F 3/0488* | (2013.01) |
| *H04N 5/445* | (2011.01) |
| *H04N 5/50* | (2006.01) |
| *H04N 5/44* | (2011.01) |

(52) U.S. Cl.
CPC ....... *H04N 21/42218* (2013.01); *H04N 5/4403* (2013.01); *G06F 3/04886* (2013.01); *H04N 5/44591* (2013.01)

(58) Field of Classification Search
CPC .................... H04N 21/42218; H04N 5/44591; H04N 5/4403; G06F 3/04886
USPC .......... 725/37, 40, 43; 348/731, 734; 715/773
See application file for complete search history.

(56) References Cited

U.S. PATENT DOCUMENTS

| | | | | |
|---|---|---|---|---|
| 3,879,722 | A | * | 4/1975 | Knowlton .......................... 345/7 |
| 2008/0285857 | A1 | * | 11/2008 | Sharan et al. ................. 382/209 |

(Continued)

FOREIGN PATENT DOCUMENTS

| | | |
|---|---|---|
| CN | 101820514 A | 9/2010 |
| CN | 101916159 A | 12/2010 |
| CN | 101964141 A | 2/2011 |

OTHER PUBLICATIONS

International Search Report issued in PCT/CN2012/077910 mailed on Oct. 18, 2012 (2 pages).

*Primary Examiner* — Hoang-Vu A Nguyen-Ba
(74) *Attorney, Agent, or Firm* — Osha Liang LLP

(57) ABSTRACT

A method for inputting signals into a smart TV and a smart interaction system includes displaying a virtual keyboard having a key layout corresponding to that of a physical keyboard used for inputting signals into a smart TV; obtaining from the physical keyboard a first signal, which is generated in response to an operator selecting a physical key on the physical keyboard and is indicative of information on a position of the selected physical key on the physical keyboard; and displaying on the virtual keyboard the position of the selected physical key based on the first signal.

6 Claims, 3 Drawing Sheets

(56) References Cited

U.S. PATENT DOCUMENTS

| | | | |
|---|---|---|---|
| 2008/0291059 A1* | 11/2008 | Longe | 341/22 |
| 2009/0273718 A1* | 11/2009 | Barbaroux et al. | 348/734 |
| 2012/0128143 A1* | 5/2012 | Rudman | 379/110.01 |

* cited by examiner

METHODS FOR INPUTTING SIGNALS INTO A SMART TV, A SMART TV, AND A SMART INTERACTION SYSTEM USING SUCH METHODS

TECHNICAL FIELD

The present invention relates to smart television (TV) technology, and more particularly, to an input method, a smart TV and a smart interaction system.

BACKGROUND

As the smart TV technology becomes popular, a user usually desires to input text information while browsing web pages or using applications such as QQ messaging. Therefore, a user-friendly input method for achieving the above function will provide the user with improved user experience.

In the prior art, a virtual keyboard is displayed on a screen of a smart TV and the user selects characters to be input using a remote controller or a mouse. However, this technique is inefficient despite its friendly and visual interface. The user can also input characters by using an ordinary keyboard or a T9 phone keypad. While the input speed is fast in such a case, the smart TV's user may have bad user experience.

The inventors have found the following problem in the prior art. For a smart TV user, it is unrealistic for the user to input information by touch typing. Hence, in order to input information to the smart TV, the user has to raise his/her head from time to time to check the input information displayed on the smart TV and lower his/her head from time to time to check the input operations by his/her fingers on a real physical keyboard.

SUMMARY

It is an object of the present invention to provide an input method, a smart TV and a smart interaction system that are capable of assisting a user in inputting information to a smart TV with an improved efficiency.

In order to achieve the above object, according to an embodiment of the present invention, an input method is provided. The method is applied in a smart TV for inputting to the smart TV via a physical keyboard. The method comprises: displaying, on a display screen of the smart TV, a virtual keyboard having a key layout corresponding to that of the physical keyboard; obtaining from the physical keyboard a first signal that is generated in response to an operator selecting a physical key on the physical keyboard and indicates information on position of the operator on the physical keyboard; and causing a virtual key on the virtual keyboard to enter a first display state based on the first signal, the virtual key corresponding to the selected physical key.

The input method further comprises: obtaining from the physical keyboard a second signal that is generated in response to the operator triggering a physical key on the physical keyboard; and causing a virtual key on the virtual keyboard to enter a second display state based on the second signal, the virtual key corresponding to the triggered physical key. The first display state is different from the second display state.

In the input method, the step of causing the virtual key on the virtual keyboard to enter the second display state based on the second signal further comprises: displaying input information content in an input box displayed on the display screen of the smart TV.

In the input method, a physical key identifier of the physical key is consistent with a virtual key identifier of the corresponding virtual key. The first signal includes at least the physical key identifier of the physical key. The second signal includes the physical key identifier of the physical key and the input information content.

In the input method, the physical keyboard includes a positioning physical key for assisting the operator in positioning. The first signal is generated only when the operator is positioned on the positioning physical key.

The input method further comprises, prior to displaying the virtual keyboard: identifying a model of the physical keyboard and switching to a mapping table that matches the model. The mapping table maintains the virtual keyboard corresponding to the physical keyboard and records a correspondence between each physical key on the physical keyboard and its corresponding virtual key on the virtual keyboard.

According to another embodiment of the present invention, a smart TV is provided. The smart TV comprises: a display unit adapted to display a virtual keyboard having a key layout corresponding to that of a physical keyboard used for inputting to the smart TV; a receiving unit adapted to obtain from the physical keyboard a first signal that is generated in response to an operator selecting a physical key on the physical keyboard and indicates information on position of the operator on the physical keyboard; and a display selection unit coupled to the receiving unit and the display unit and adapted to cause a virtual key on the virtual keyboard displayed by the display unit to enter a first display state based on the first signal obtained by the receiving unit, the virtual key corresponding to the selected physical key.

The smart TV further comprises: a display trigger unit coupled to the receiving unit and the display unit and adapted to cause a virtual key on the virtual keyboard displayed by the display unit to enter a second display state based on a second signal obtained by the receiving unit from the physical keyboard, the second signal being generated in response to the operator triggering a physical key on the physical keyboard, the virtual key corresponding to the triggered physical key.

According to yet another embodiment of the present invention, a smart interaction system is provided. The smart interaction system comprises a physical keyboard and a smart TV. The physical keyboard has a plurality of physical keys and is used for inputting to the smart TV. The smart TV comprises: a display unit adapted to display a virtual keyboard having a key layout corresponding to that of the physical keyboard; a receiving unit adapted to obtain from the physical keyboard a first signal that is generated in response to an operator selecting a physical key on the physical keyboard and indicates information on position of the operator on the physical keyboard; and a display selection unit coupled to the receiving unit and the display unit and adapted to cause a virtual key on the virtual keyboard displayed by the display unit to enter a first display state based on the first signal obtained by the receiving unit, the virtual key corresponding to the selected physical key.

In the smart interaction system, the smart TV further comprises: a display trigger unit coupled to the receiving unit and the display unit and adapted to cause a virtual key on the virtual keyboard displayed by the display unit to enter a second display state based on a second signal obtained by the receiving unit from the physical keyboard, the second signal being generated in response to the operator triggering a physical key on the physical keyboard, the virtual key corresponding to the triggered physical key.

The above solutions of the present invention have the following advantageous effects. The physical keyboard is consistent with the virtual keyboard displayed on the smart TV. Thus, each physical key on the physical keyboard can be found in the virtual keyboard. When a physical key on the physical keyboard is selected or triggered, the input process can be viewed visually on the smart TV. In this way, the input speed can be increased and the user experience can be improved.

DETAILED DESCRIPTION OF THE EMBODIMENTS

The present invention will be described in detail with reference to the figures and embodiments, such that the problems to be solved by the present invention, the technical solutions and advantages of the present invention will become more apparent.

Figure 1:
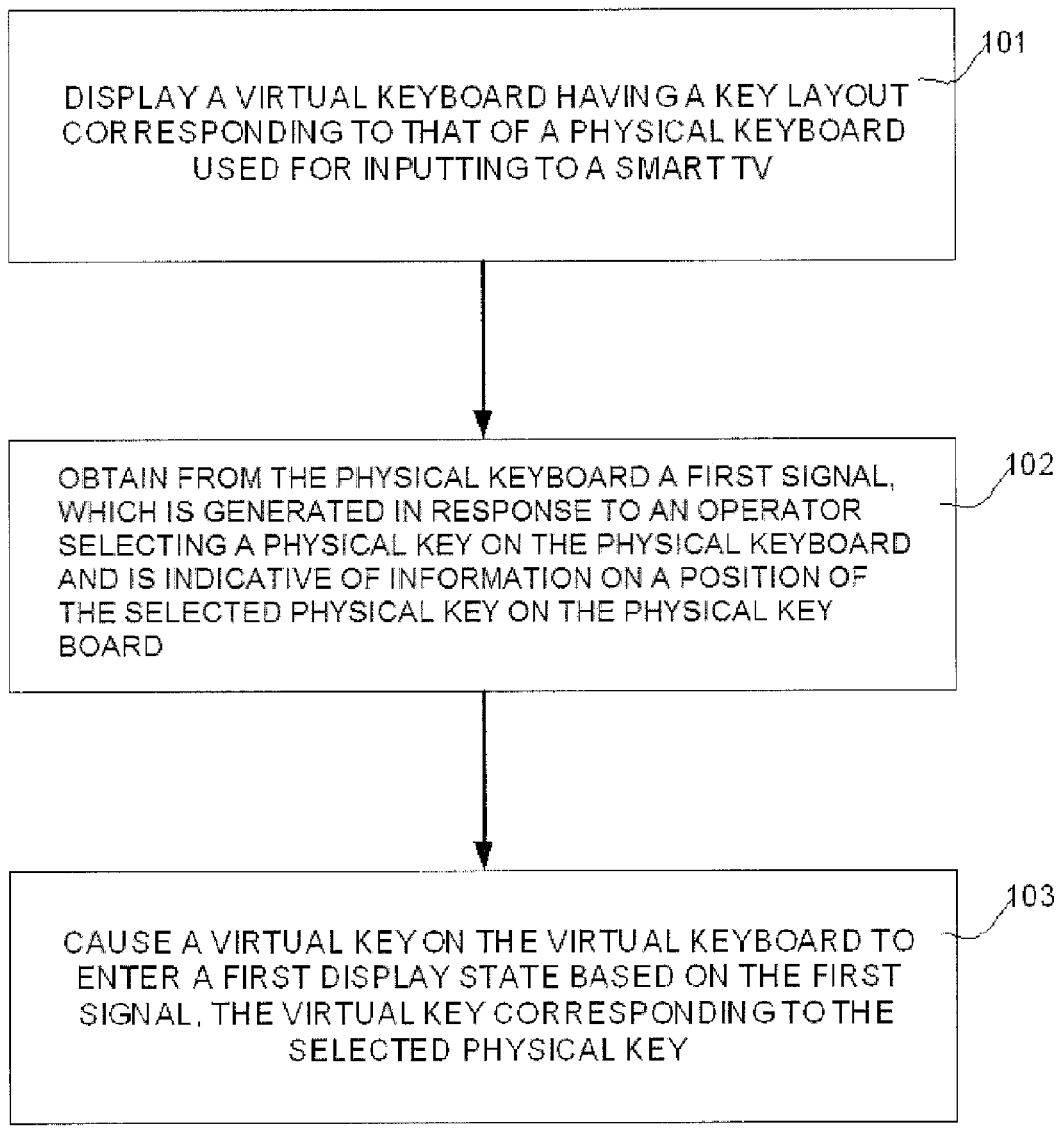
FIG. 1 is a flowchart illustrating an input method according to an embodiment of the present invention.

According to an embodiment of the present invention, an input method is provided. The method is applied in a smart TV for inputting to the smart TV via a physical keyboard. As shown in FIG. 1, the method includes the following steps.

At step 101, a virtual keyboard is displayed on a display screen of the smart TV. The virtual keyboard has a key layout corresponding to that of the physical keyboard.

At step 102, a first signal is obtained from the physical keyboard. The first signal is generated in response to an operator selecting a physical key on the physical keyboard and indicates information on position of the operator on the physical keyboard.

At step 103, a virtual key on the virtual keyboard is caused to enter a first display state based on the first signal. The virtual key corresponds to the selected physical key.

With the method according to the present invention, the physical keyboard is consistent with the virtual keyboard displayed on the smart TV. Thus, each physical key on the physical keyboard can be found in the virtual keyboard. When a physical key on the physical keyboard is selected or triggered, the input process can be viewed visually on the smart TV. In this way, the input speed can be increased and the user experience can be improved.

Figure 2:
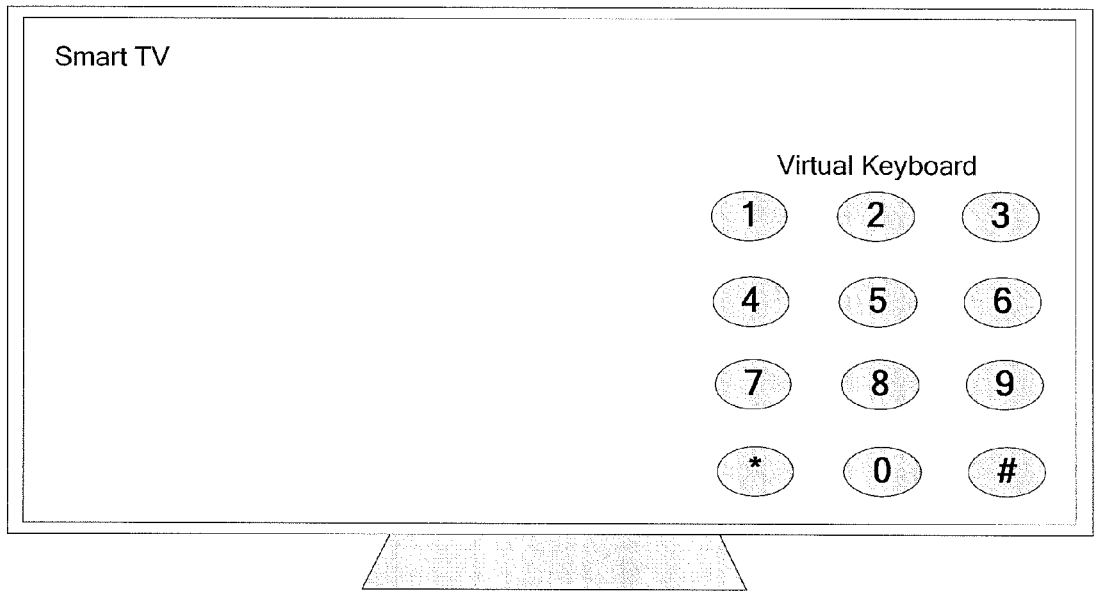
FIG. 2 is a schematic diagram showing a smart TV and a physical keyboard according to an embodiment of the present invention.
Figure 2:
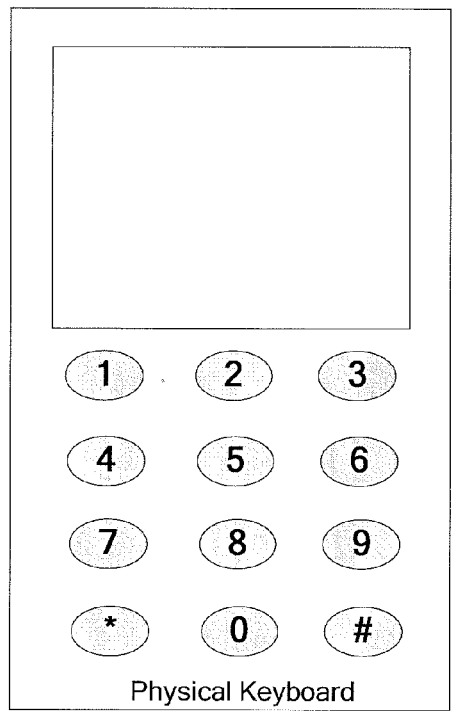

As shown in FIG. 2, the physical keyboard can be an ordinary keyboard or a T9 keypad. The ordinary keyboard may be a standard 104-key keyboard or a reduced or enhanced keyboard (e.g., a 101-key or 108-key keyboard). Each key on the physical keyboard can be pressed and the first signal is sent to the smart TV from the physical keyboard when a physical key is pressed. A touch sensitive element is provided on the surface of each key for sensing a contact between an operator and the physical key and feeding back information on the contact between the operator and the key to the smart TV. The T9 keypad is typically applied in a mobile terminal.

The virtual keyboard is displayed on the display screen of the smart TV and has a key layout corresponding to that of the physical keyboard. Here a "corresponding" key layout means that the virtual keyboard is the same as the physical keyboard with respect to the key layout, key's appearance and key's position on the keyboard. Alternatively, the key layout of the virtual keyboard may be different from that of the physical keyboard (e.g., the keys on the virtual keyboard and the keys on the physical keyboard may have different colors, shapes or other appearance characteristics), but the virtual keyboard are the same as the physical keyboard with respect to relative positions among respective keys. In this way, when the key layout of the virtual keyboard is displayed on the smart TV, the user can know the key layout of the physical keyboard visually from key layout of the virtual keyboard.

In a preferred embodiment, the method further includes: obtaining from the physical keyboard a second signal that is generated in response to the operator triggering a physical key on the physical keyboard; and causing a virtual key on the virtual keyboard to enter a second display state based on the second signal. The virtual key corresponds to the triggered physical key. The first display state is different from the second display state. Here, the first display state indicates the information on the position of the operator on the physical keyboard. In particular, a flicker, a change in color or another change may be shown at a certain position on the virtual keyboard that is consistent with the position of the operator on the physical keyboard. This position can be a physical key corresponding to the selected physical key or a certain position on the surface of the keyboard. The second display state indicates that a certain physical key on the physical keyboard is triggered by the operator. In particular, a flicker, a change in color or another change at the virtual key corresponding to the physical key may be shown. The flicker, change in color or another change shown in the first display state can be different from those shown in the second display state. For example, when it is configured to show a red color in the first display state, it can be configured to show a yellow color in the second display state.

The step of causing the virtual key on the virtual keyboard to enter the second display state based on the second signal further includes displaying input information content in an input box displayed on the display screen of the smart TV.

In this context, "selecting" and "triggering" are two different actions by the operator. The "selecting" herein means that the operator has confirmed a current physical key and it needs to contact or touch the physical key to indicate that the current action is a "selecting" action. A "selecting" action itself does not input any information to the smart TV, but only indicates that the operator is currently positioned at the physical key. A first signal is generated in association with a selecting action. On the other hand, the "triggering" herein means that a physical key is currently selected and effectively pressed for inputting information to the smart TV. A second signal is generated in association with a triggering action. Each physical key has a corresponding virtual key. Due to the correspondence between a physical key and a virtual key, the user can know the particular physical key that is currently selected or triggered by viewing the virtual key on the smart TV. When a physical key is selected, its corresponding virtual key enters the first display state such that the user can view visually on the smart TV that the physical key is selected. When a physical key is triggered, its corresponding virtual key enters the second display state such that the user can view visually on the smart TV that the physical key is triggered.

In particular, after a virtual key on the virtual keyboard that corresponds to a physical key is selected or triggered, the virtual key may draw the user's attention by regularly flicking, changing its color or otherwise stimulating the user's visual sense.

In a preferred embodiment, a physical key identifier of the physical key is consistent with a virtual key identifier of the corresponding virtual key. The first signal includes at least the physical key identifier of the physical key. The second signal includes the physical key identifier of the physical key and the input information content.

The first signal can be an infrared (IR) signal and/or a radio frequency (RF) signal (e.g., an RF signal at 2.4 GHz). The second signal can be an IR signal and/or an RF signal (e.g., an RF signal at 2.4 GHz).

In an application scenario, the operator can be a finger of the user. When the finger contacts a key on the physical keyboard, the physical keyboard will generate a first signal and send it to the smart TV.

Since the physical key identifier of the physical key is consistent with the virtual key identifier of the corresponding virtual key and the first signal indicates the information on the position of the operator on the physical keyboard, the smart TV can determine a corresponding virtual key upon receiving the first signal. The smart TV then displays the determined virtual key in the first display state and shows the current position of the finger on the virtual keyboard. The smart TV is even capable of displaying information indicating the state where the finger and the physical keyboard are in contact with each other, thereby assisting the finger in positioning on the physical keyboard.

Then, the finger strikes the key on the physical keyboard to perform an inputting operation. Upon receiving an effective strike, the physical keyboard generates a second signal and sends it to the smart TV.

The smart TV receives the second signal. Since the second signal includes the physical key identifier of the physical key and the input information content, the corresponding virtual key can perform the inputting function. Alternatively, the smart TV can perform the inputting function directly based on the information content included in the second signal from the physical keyboard. In addition, the input information content can be displayed at the corresponding virtual key.

In a preferred embodiment, the physical keyboard includes a positioning physical key for assisting the operator in positioning. Hence, the first signal is generated only when the operator is positioned on the positioning physical key.

The positioning physical key is similar to the "F" and "J" keys of an ordinary 104-key keyboard for facilitating the user to position his/her fingers tactilely, rather than visually, during touch typing. When the finger is positioned on the positioning physical key, it is indicated that the use is ready to input. In this case, the physical keyboard generates and sends the first signal when the finger is positioned on the positioning physical key. There is no need for generating the first signal when the finger is positioned on a physical key other than the positioning physical key.

In this way, the cost can be reduced since it is unnecessary to provide a touch sensitive element on the surface of every physical key for monitoring whether the operator contacts the physical key (i.e., selecting the physical key). Instead, the monitoring can be achieved by providing a touch sensitive element only on the surface of each of a limited number (e.g., two) of positioning physical keys, without obstructing the physical keyboard from generating the second signal after the finger effectively strikes a physical key on the physical keyboard.

In a preferred embodiment, prior to displaying the virtual keyboard, a model of the physical keyboard is identified and a mapping table that matches the model is retrieved. The mapping table maintains the virtual keyboard corresponding to the physical keyboard and records a correspondence between each physical key on the physical keyboard and its corresponding virtual key on the virtual keyboard.

Various physical keyboards are produced by various manufacturers. Thus, it is desirable that the solutions according to the embodiments of the present invention can support different types of physical keyboards. The physical keyboard can be an ordinary keyboard or a T9 keypad. The ordinary keyboard may be a standard 104-key keyboard or a reduced or enhanced keyboard (e.g., a 101-key or 108-key keyboard). Different physical keyboards may have different key layouts, positions of respective physical keys or appearances of physical keys. Therefore, a mapping table can be provided for maintaining virtual keyboards corresponding to different physical keyboards. The information maintained in the mapping table includes, without limitation, layout of physical keyboard, position of each physical key, appearance of each physical key, input content for each physical key and correspondence between physical key identifier of each physical key and virtual key identifier. In other words, each physical keyboard should be consistent with its corresponding virtual keyboard in the mapping table with respect to appearance, layout, function, state transition and even color. In this way, it is ensured that the user can input accurately and conveniently while viewing the virtual keyboard on the smart TV.

Figure 3:
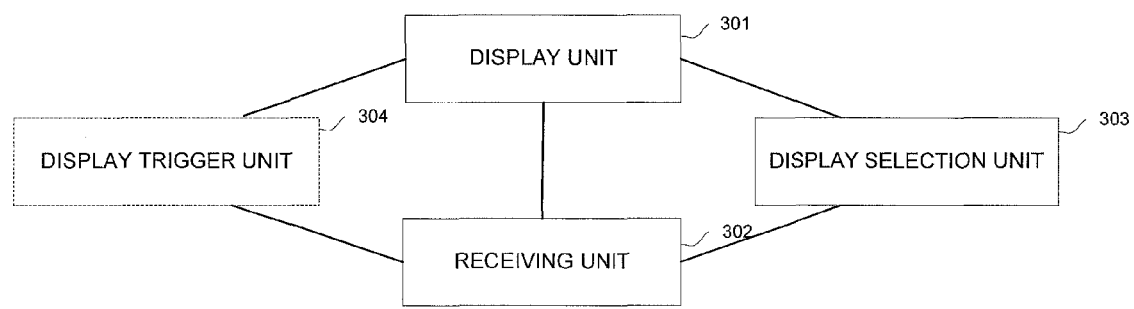
FIG. 3 is a schematic diagram showing a structure of a smart TV according to an embodiment of the present invention.

According to another embodiment of the present invention, a smart TV is provided. As shown in FIG. 3, the smart TV includes the following units.

A display unit 301 is adapted to display a virtual keyboard having a key layout corresponding to that of a physical keyboard used for inputting to the smart TV.

A receiving unit 302 is adapted to obtain from the physical keyboard a first signal that is generated in response to an operator selecting a physical key on the physical keyboard and indicates information on position of the operator on the physical keyboard.

A display selection unit 303 is coupled to the receiving unit 302 and the display unit 301 and adapted to cause a virtual key on the virtual keyboard displayed by the display unit to enter a first display state based on the first signal obtained by the receiving unit. The virtual key corresponds to the selected physical key.

The smart TV further includes a display trigger unit 304 coupled to the receiving unit 302 and the display unit 301 and adapted to cause a virtual key on the virtual keyboard displayed by the display unit to enter a second display state based on a second signal obtained by the receiving unit from the physical keyboard. The second signal is generated in response to the operator triggering a physical key on the physical keyboard. The virtual key corresponds to the triggered physical key.

With the above solutions of the present invention, the physical keyboard is consistent with the virtual keyboard displayed on the smart TV. Thus, each physical key on the physical keyboard can be found in the virtual keyboard. When a physical key on the physical keyboard is selected or triggered, the input process can be viewed visually on the smart TV. In this way, the input speed can be increased and the user experience can be improved.

According to yet another embodiment of the present invention, a smart interaction system is provided. As shown in FIG. 2, the smart interaction system includes a physical keyboard and a smart TV. The physical keyboard has a plurality of physical keys and is used for inputting to the smart TV. The smart TV includes the following units.

A display unit 301 is adapted to display a virtual keyboard having a key layout corresponding to that of the physical keyboard.

A receiving unit 302 is adapted to obtain from the physical keyboard a first signal that is generated in response to an operator selecting a physical key on the physical keyboard and indicates information on position of the operator on the physical keyboard.

A display selection unit 303 is coupled to the receiving unit 302 and the display unit 301 and adapted to cause a virtual key on the virtual keyboard displayed by the display unit to enter a first display state based on the first signal obtained by the receiving unit. The virtual key corresponds to the selected physical key.

In the smart interaction system, the smart TV further includes: a display trigger unit 304 coupled to the receiving unit 302 and the display unit 301 and adapted to cause a virtual key on the virtual keyboard displayed by the display unit to enter a second display state based on a second signal obtained by the receiving unit from the physical keyboard. The second signal is generated in response to the operator triggering a physical key on the physical keyboard. The virtual key corresponds to the triggered physical key.

The above solutions of the present invention have the following advantageous effects. The physical keyboard is consistent with the virtual keyboard displayed on the smart TV. Thus, each physical key on the physical keyboard can be found in the virtual keyboard. When a physical key on the physical keyboard is triggered, the user can view visually that the corresponding virtual key on the virtual keyboard is triggered. In this way, the input speed can be increased and the user experience can be improved.

While the preferred embodiments of the present invention have been described, it should be noted that improvements and modifications can be made by those skilled in the art without departing from the principle of the present invention and these improvements and modifications are to be encompassed by the scope of the present invention.

What is claimed is:

1. An input method, applied in a smart TV, for inputting to the smart TV via a physical keyboard, the method comprising:
    displaying, on a display screen of the smart TV, a virtual keyboard having a key layout corresponding to that of the physical keyboard;
    obtaining from the physical keyboard a first signal, which is generated in response to an operator selecting a physical key on the physical keyboard and is indicative of information on a position of the selected physical key on the physical keyboard;
    causing a virtual key on the virtual keyboard to enter a first display state based on the first signal, the virtual key corresponding to the selected physical key;
    obtaining from the physical keyboard a second signal, which is generated in response to the operator triggering a physical key on the physical keyboard and is indicative of information on a position of the triggered physical key on the physical keyboard; and
    causing a virtual key on the virtual keyboard to enter a second display state based on the second signal, the virtual key corresponding to the triggered physical key;
    wherein the first display state is different from the second display state;
    wherein a physical key identifier of the physical key is consistent with a virtual key identifier of the corresponding virtual key, the first signal includes at least the physical key identifier of the physical key, and the second signal includes the physical key identifier of the physical key and the input information content.

2. The input method of claim 1, wherein the step of causing the virtual key on the virtual keyboard to enter the second display state based on the second signal further comprises:
    displaying input information content in an input box displayed on the display screen of the smart TV.

3. The input method of claim 1, wherein the physical keyboard includes a positioning physical key for assisting the operator in positioning, and the first signal is generated only when the operator is positioned on the positioning physical key.

4. The input method of claim 1, further comprising, prior to displaying the virtual keyboard:
    identifying a model of the physical keyboard and switching to a mapping table that matches the model, the mapping table maintaining the virtual keyboard corresponding to the physical keyboard and recording a correspondence between each physical key on the physical keyboard and its corresponding virtual key on the virtual keyboard.

5. A smart TV, comprising:
    a display unit adapted to display a virtual keyboard having a key layout corresponding to that of a physical keyboard used for inputting to the smart TV;
    a receiving unit adapted to obtain from the physical keyboard a first signal, which is generated in response to an operator selecting a physical key on the physical keyboard and is indicative of information on a position of the selected physical key on the physical keyboard;
    a display selection unit coupled to the receiving unit and the display unit and adapted to cause a virtual key on the virtual keyboard displayed by the display unit to enter a first display state based on the first signal obtained by the receiving unit, the virtual key corresponding to the selected physical key; and
    a display trigger unit coupled to the receiving unit and the display unit and adapted to cause a virtual key on the virtual keyboard displayed by the display unit to enter a second display state based on a second signal obtained by the receiving unit from the physical keyboard, wherein the second signal is generated in response to the operator triggering a physical key on the physical keyboard and is indicative of information on a position of the triggered physical key on the physical keyboard, the virtual key corresponding to the triggered physical key;
    wherein the first display state is different from the second display state;
    wherein a physical key identifier of the physical key is consistent with a virtual key identifier of the corresponding virtual key, the first signal includes at least the physical key identifier of the physical key, and the second signal includes the physical key identifier of the physical key and the input information content.

6. A smart interaction system comprising a physical keyboard and a smart TV, wherein the physical keyboard has a plurality of physical keys and is used for inputting to the smart TV, and the smart TV comprises:
    a display unit adapted to display a virtual keyboard having a key layout corresponding to that of the physical keyboard;
    a receiving unit adapted to obtain from the physical keyboard a first signal, which is generated in response to an operator selecting a physical key on the physical keyboard and is indicative of information on a position of the operator on the physical keyboard;
    a display selection unit coupled to the receiving unit and the display unit and adapted to cause a virtual key on the virtual keyboard displayed by the display unit to enter a first display state based on the first signal obtained by the receiving unit, the virtual key corresponding to the selected physical key; and a display trigger unit coupled to the receiving unit and the display unit and adapted to cause a virtual key on the virtual keyboard displayed by the display unit to enter a second display state based on a second signal obtained by the receiving unit from the physical keyboard, wherein the second signal is generated in response to the operator triggering a physical key on the physical keyboard and is indicative of information on a position of the triggered physical key on the physical keyboard, the virtual key corresponding to the triggered physical key;

wherein the first display state is different from the second display state;

wherein a physical key identifier of the physical key is consistent with a virtual key identifier of the corresponding virtual key, the first signal includes at least the physical key identifier of the physical key, and the second signal includes the physical key identifier of the physical key and the input information content.

* * * * *